Sept. 22, 1931.  E. M. ENZENAUER ET AL  1,824,011
OFFSET DISK HARROW
Filed April 22, 1930  2 Sheets-Sheet 2
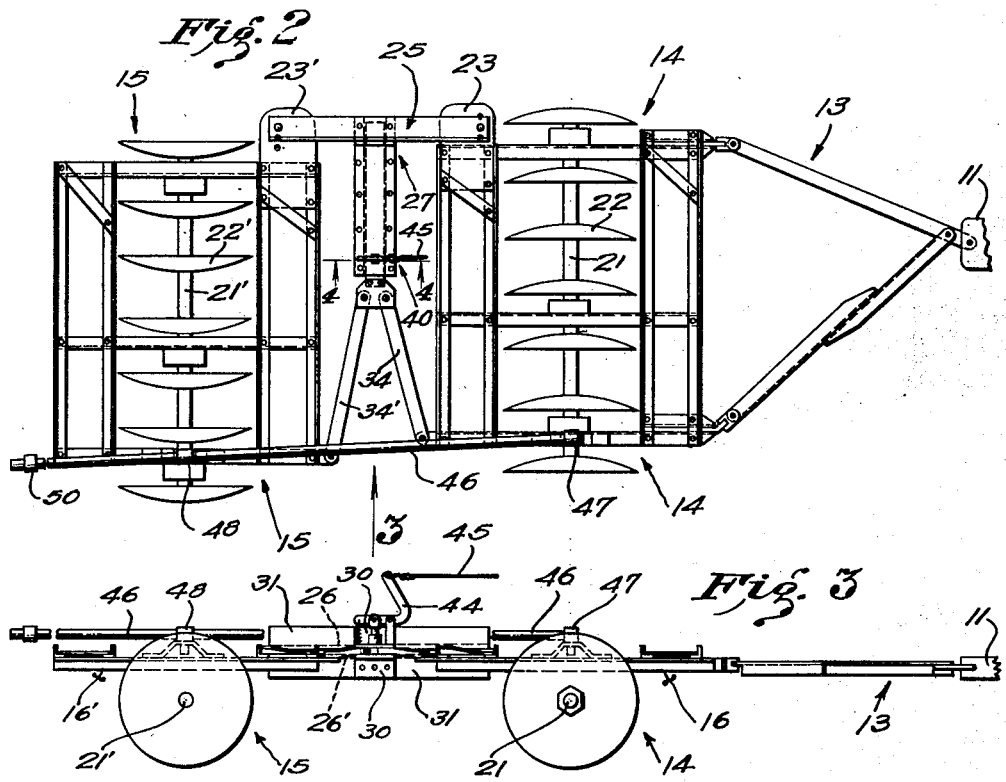
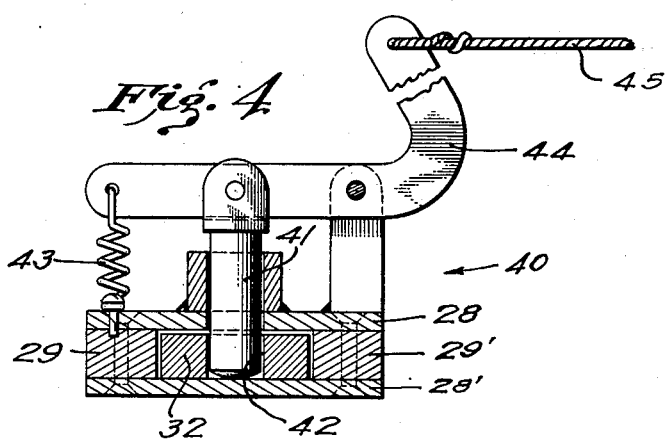
INVENTOR.
Edward M. Enzenauer
Rollie H. Mitchell
BY
ATTORNEY Patented Sept. 22, 1931

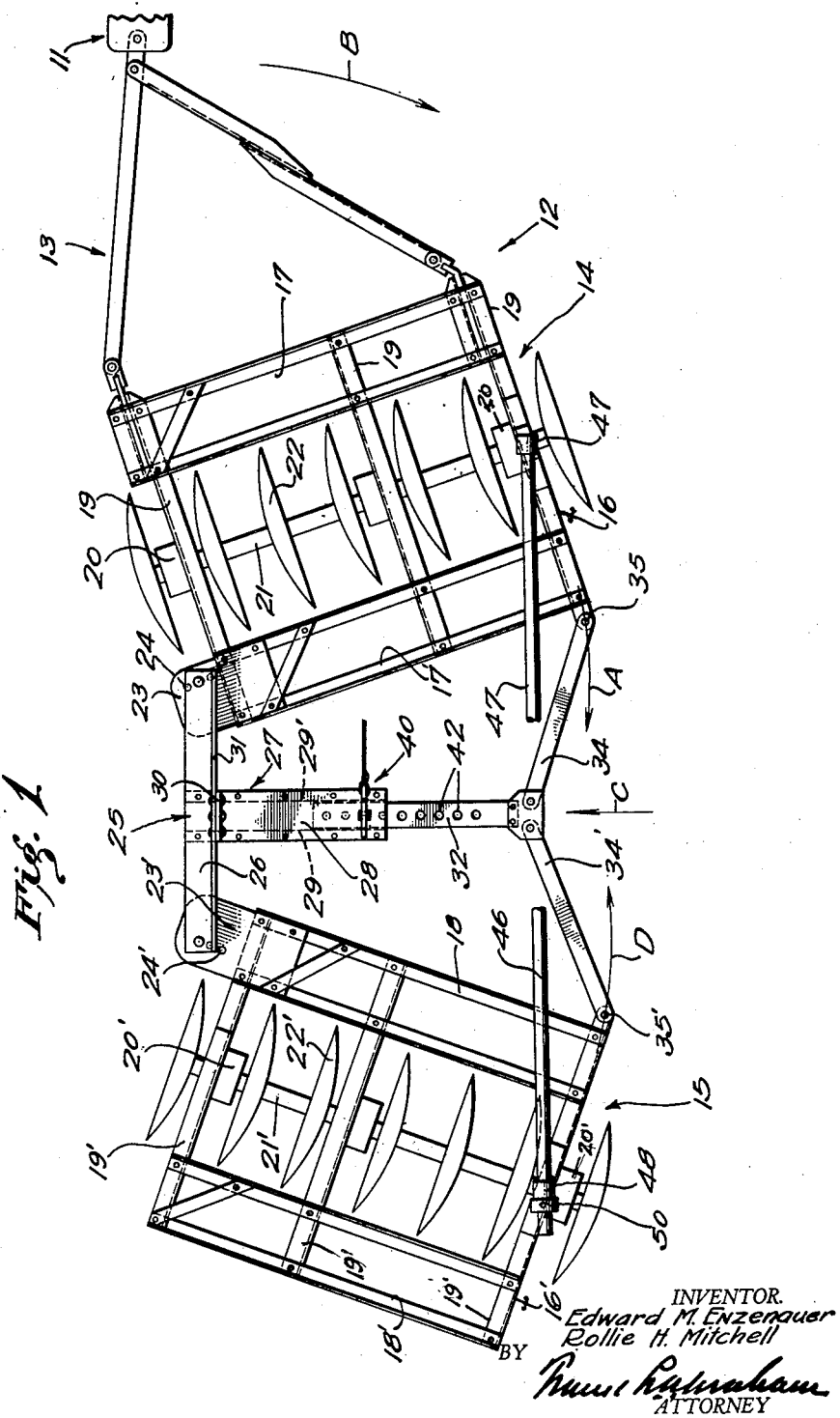

1,824,011

UNITED STATES PATENT OFFICE

EDWARD M. ENZENAUER, OF MAYWOOD, AND ROLLIE H. MITCHELL, OF HUNTINGTON PARK, CALIFORNIA, ASSIGNORS TO KILLEFER MANUFACTURING CORPORATION, A CORPORATION OF CALIFORNIA

OFFSET DISK HARROW

Application filed April 22, 1930. Serial No. 446,287.

This invention has to do in a general way with that class of ground working implements ordinarily known as offset disk harrows. It is well known to those familiar with the art, that the offset disk harrow is a comparatively recent development, designed primarily for use in cultivating the soil in orchards or the like, where it is desirable that the implement be drawn in a manner such that it is positioned at one side of the line of draft. Such devices permit the cultivation of the soil beneath the overhanging foliage of trees without necessitating the tractor, which is used to pull the implement, brushing against the foliage. Various harrows of this type have been developed and have been operated with a certain amount of success. There is, however, in the offset harrow, one feature which has always caused considerable annoyance, and which it is one of the objects of this invention to overcome. This feature resides in the procedure of turning the harrow or in reversing the same by the application of a backward force to the draw bar. In most of the offset disk harrows with which we are familiar, it is extremely difficult, if not impossible, to turn them to the right or about a point situated on the side opposite to which the two gangs of the harrows are attached to one another.

It is the primary object of this invention to produce a harrow of the class described, which is of simple form and construction, and in which the two gangs are arranged in a manner such that the unit may be turned to either the right or the left without difficulty. This object is accomplished through the medium of a novel type of gang connecting mechanism whereby the swinging movement of one of the gangs imparts an equal swinging movement in the opposite direction to the other gang. In this manner the working angle may be positively controlled and there is no tendency for one of the gangs to change in angular relation to the other gang during the operation of the unit, as is the case in some of the harrows of this type with which we are familiar.

It is a further object of this invention to produce a connecting mechanism which may be readily adjusted from the seat of the tractor so as to control the angular relation between the gangs, thereby facilitating the adjustment of the unit so as to obtain the working angle of maximum efficiency for all soil conditions.

It is a still further object of this invention to produce a harrow unit of the class described, wherein the two gangs are maintained in substantially the same plane at all times. This is accomplished by connecting one side of one gang with the corresponding side of the other gang by a rigid connecting bar, and by providing a hold-down bar at the opposite sides of the gangs, such hold-down bar being slidable with respect to one of the gangs.

It is a noteworthy feature of this invention that the hold-down bar provides means whereby the harrow unit may be set to swing to the proper working angle so that after this angle has been determined by the operator, the unit requires no further adjustment, as would otherwise be the case after the gangs are permitted to close during a right hand turn.

The details in the construction of a preferred embodiment of this invention, together with other objects attending its production, will be best understood from the following description of the accompanying drawings which are chosen for illustrative purposes only, and in which Fig. 1 is a plan view of a harrow contemplated by this invention, which shows the gangs arranged in a working position;

Fig. 2 is a plan view similar to Fig. 1, but showing the gangs as having been closed;

Fig. 3 is an elevational view which may be considered as having been taken in the direction of the arrow 3 in Fig. 2;

Fig. 4 is an enlarged detail view of a preferred form of latch mechanism which may be employed in locking the gangs in angular relation with each other and may be considered as having been taken in a plane represented by the line 4—4 in Fig. 2.

More particularly describing the invention as herein illustrated, reference numeral 11 indicates the draw bar of a tractor to which an offset disk harrow 12 is connected through the medium of a draft connection 13. The offset harrow 12 consists of a front gang 14 and a rear gang 15. The gangs 14 and 15 are of the usual construction, consisting of frames 16 and 16' respectively, such frames comprising transverse sections 17, 17' and 18, 18', which are connected by means of longitudinal members 19 and 19' respectively. The longitudinal members 19 and 19' carry bearing blocks 20 and 20' which receive disk shafts 21 and 21'. The shaft 21 carries a plurality of disks 22 and the shaft 21' carries a plurality of disks 22' which are arranged in opposed relation with respect to the disks 22, so that the disks in the rear gang throw the soil in the opposite direction to the disks in the front gang. This last mentioned feature is the usual construction in disk harrows of this nature.

Reference numerals 23 and 23' indicate plate members which are mounted upon the rear transverse member 17' and the front transverse members 18 on the front and rear gangs respectively. The plate members 23 and 23' are provided with a series of apertures 24 and 24' by means of which the opposite ends of a rigid connecting member or bar 25 are pivotally attached to the corresponding (left) sides of the front and rear gang frames respectively. The rigid connecting bar 25 is shown as consisting of two superposed members 26 and 26', which are attached to opposite sides of the plates 23 and 23' so as to leave a space therebetween.

Rigidly mounted between the mid portion of the connecting bar 25, comprising members 26 and 26', is a sleeve or track member 27, which is shown in Fig. 4 as consisting of a pair of spaced plates 28 and 28' which are held in spaced relation with each other by means of spacing members 29 and 29'. The spacing members 29 and 29' extend between the plates 26 and 26' of the rigid connecting member 25, and the spaced plates 28 and 28' have provided on their outer ends flanges 30, by means of which they are attached to side flanges 31 which are formed on the connecting plates 26 and 26'.

The track member 27 forms one element of what we will hereinafter refer to as an expansible guide means, which includes a tongue 32 slidably mounted in the sleeve or track member 27. The outer end portion of the tongue 32 has pivotally attached thereto a pair of links 34 and 34', the outer ends of these links being pivotally attached to the frames 16 and 16' respectively, as indicated by reference numerals 35 and 35'.

It will be seen from the relative positions of the gangs in Figures 1 and 2 that the guide member, consisting of the sleeve or track 27 and the tongue 32, cooperate with the hinge member comprising links 34 and 34' to form an expansible connection which will effect a swinging movement of either of the gangs 14 or 15 about its pivot point in the rigid connecting member 25, when the other gang is swinging about its corresponding pivot point. In other words, when the gang 14 is swinging rearwardly in the direction of the arrow A, as would be effected in the event a force were applied to the draft connection in the direction of the arrow B, such movement will push the tongue 32 inwardly in the direction of the arrow C, which in turn will be effective to swing the rear gang 15 forward in the direction of the arrow D. This movement may be effected, as pointed out above, by applying a force in the direction of the arrow B to the draft member, which would take place in the event the unit were being turned to the right, and the same movement will take place in the event a rearward force is applied to the draft connection. It will be seen, therefore, that the two gangs may be swung into parallel relation with each other during a right hand turn, or in the event it is desired to place them in parallel relation with each other for transporting the disk on a highway, this relation can be established by applying a rearward force to the draft connection.

It was pointed out hereinabove that the harrow contemplated by this invention embodies means for locking the gangs in various positions of angularity with respect to each other. Such a locking action is accomplished by providing a latch mechanism 40 on the track member 27, such mechanism consisting of a pin 41, which is adapted to be forced into any one of a series of apertures 42 provided in the tongue member 32, by means of a spring 43. The latch is released by applying a forward force to the lever section 44 thereof and this force is preferably effected through the medium of a rope or cable 45 which extends to the seat of the tractor.

It will be apparent from the construction so far described, that the rigid connecting member 25 is effective to hold one side of the frames of the gangs 14 and 15 in substantially the same plane, and in order that the opposite sides of the gangs may be likewise held in the same plane, we provide a hold-down bar generally indicated by reference numeral 46. The hold-down bar 46 is shown as being pivotally attached at its forward end to the front gang 14, as indicated at 47. The rear end portion of the hold-down bar 46 is slidable through a sleeve 48 which is pivotally mounted on the rear gang frame 16'. It will be seen, therefore, that the two gangs are always maintained in substantially parallel relation with each other so as to produce a uniform cutting or cultivating action upon the soil.

It will be apparent from the foregoing description that the harrow contemplated by this invention may be set to operate at any working angle by means of the latch 40 in conjunction with the apertures in the tongue 32. It is well known to those familiar with the art, that certain soil conditions require certain working angles in a disk harrow to produce the maximum cultivating efficiency, and after this angle has been determined through the adjustment of the latch mechanism referred to above, the unit may be permanently set so that it will not open beyond the proper working angle by properly positioning an adjustable collar 50 upon the rear end of the hold-down bar 46. It will also be apparent that the series of apertures 24 and 24' in the plate members 23 and 23' may be employed to set the gangs at various offset positions with respect to each other. This adjustment makes it possible to vary the positions of the disks in the rear gang with respect to the disks in the front gang, so as to obtain the maximum cultivating efficiency for various soil conditions.

It is to be understood that while we have herein described and illustrated one preferred form of the invention, the invention is not limited to the precise construction described above, but includes within its scope whatever changes fairly come within the spirit of the appended claims.

We claim as our invention:

1. A disk harrow embodying the combination of: a front gang and a rear gang arranged in tandem relation; draft means on the front gang; a rigid connection pivotally attached to one side of the front gang and to the corresponding side of the rear gang; and expansible connection interposed between the opposite side of the front gang and the correspondingly opposite side of the rear gang; and means for holding said rear gang against bodily movement laterally of said front gang.

2. A disk harrow embodying the combination of: a front gang and a rear gang arranged in tandem relation; draft means on the front gang; a rigid connection pivotally attached to one side of the front gang and to the corresponding side of the rear gang; and an expansible connection interposed between the opposite side of the front gang and the correspondingly opposite side of the rear gang, said expansible connection comprising expansible guide means and links pivotally attached at one end to said guide means and having their outer ends pivotally attached to said gangs for swinging one gang about its pivot point on said rigid connection when the other gang is swung about its corresponding pivot point.

3. A disk harrow embodying the combination of: a front gang and a rear gang arranged in tandem relation; draft means on the front gang; a rigid connection pivotally attached to one side of the front gang and to the corresponding side of the rear gang; an expansible connection interposed between the opposite side of the front gang and the correspondingly opposite side of the rear gang, said expansible connection comprising expansible guide means and links pivotally attached at one end to said guide means and having their outer ends pivotally attached to said gangs for swinging one gang about its pivot point on said rigid connection when the other gang is swung about its corresponding pivot point; and means for releasably locking said expansible connection in various positions so that said gangs may be made to assume a plurality of predetermined angles relative to each other.

4. A disk harrow embodying the combination of a front gang and a rear gang arranged in tandem relation; draft means on the front gang; a rigid connection pivotally attached to one side of the front gang and to the corresponding side of the rear gang; and an expansible connection interposed between the opposite side of the front gang and the correspondingly opposite side of the rear gang, said expansible connection comprising a sleeve member rigidly attached to said rigid connection, a tongue slidably mounted in said sleeve member and links having their inner ends pivotally attached to said tongue and having their outer ends pivotally attached to corresponding sides of said front and rear gangs.

5. A disk harrow embodying the combination of: a front gang and a rear gang arranged in tandem relation; draft means on the front gang; a rigid connection pivotally attached to one side of the front gang and to the corresponding side of the rear gang; and an expansible connection interposed between the opposite side of the front gang and the correspondingly opposite side of the rear gang, said expansible connection comprising a sleeve member rigidly attached to said rigid connection, a tongue slidably mounted in said sleeve member, links having their inner ends pivotally attached to said tongue and having their outer ends pivotally attached to corresponding sides of said front and rear gangs, and a latch for releasably locking said tongue at various predetermined points in said sleeve.

6. A disk harrow embodying the combination of: a front gang and a rear gang arranged in tandem relation; draft means on the front gang; a rigid connection pivotally attached to one side of the front gang and to the corresponding side of the rear gang; an expansible connection interposed between the opposite side of the front gang and the correspondingly opposite side of the rear gang; means for holding said rear gang against bodily movement laterally of said front gang; and a hold-down bar attached to said front and rear gangs, said hold down bar being slidable relative to one of said gangs.

7. A disk harrow embodying the combination of: a front gang and a rear gang arranged in tandem relation; draft means on the front gang; a rigid connection pivotally attached to one side of the front gang and to the corresponding side of the rear gang; an expansible connection interposed between the opposite side of the front gang and the correspondingly opposite side of the rear gang, said expansible connection comprising a spreader member and a guide member associated therewith; and means for holding said rear gang against bodily movement laterally of said front gang.

8. A disk harrow embodying the combination of: a front gang and a rear gang arranged in tandem relation; draft means on the front gang; a rigid connection pivotally attached to one side of the front gang and to the corresponding side of the rear gang; and an expansible connection interposed between the opposite side of the front gang and the correspondingly opposite side of the rear gang, said expansible connection comprising a spreader member, a guide member associated therewith and means for locking said guide member in various predetermined positions for holding said rear gang against bodily movement laterally of said front gang.

9. A disk harrow embodying the combination of: a front gang and a rear gang arranged in tandem relation; draft means on the front gang; a rigid connection pivotally attached to one side of the front gang and to the corresponding side of the rear gang; and an expansible connection interposed between the opposite side of the front gang and the correspondingly opposite side of the rear gang, said expansible connection comprising a spreader member having its outer ends pivotally attached to corresponding side portions of said gangs, and a guide member attached to the inner end of said spreader member and adapted to hold the same on a predetermined line with respect to the angles between said gangs.

10. A disk harrow embodying: a front gang and a rear gang arranged in tandem relation with each other; a connecting bar having its opposite end portions pivotally attached to corresponding sides of said gangs; a guide member mounted on said bars, and a pair of links having their inner ends pivotally attached to the outer end of said guide member and having their outer ends pivotally connected to the respective gangs.

11. A disk harrow embodying: a front gang and a rear gang arranged in tandem relation with each other, a connecting bar having its opposite end portions pivotally attached to corresponding sides of said gangs; an expansible guide means mounted on said bar and a pair of links having their inner ends pivotally attached to the outer end of said guide means and having their outer ends pivotally connected to the respective gangs.

12. A disk harrow embodying: a front gang and a rear gang arranged in tandem relation with each other; a connecting bar having its opposite end portions pivotally attached to corresponding sides of said gangs; an expansible guide means mounted on said bar; a pair of links having their inner ends pivotally attached to the outer end of said guide means and having their outer ends pivotally connected to the respective gangs; and latch means for locking said expansible means in various positions of expansion.

13. A disk harrow embodying: a front gang and a rear gang arranged in tandem relation with each other; a connecting bar having its opposite end portions pivotally attached to corresponding sides of said gangs; a track member rigidly mounted on said connecting bar along a line which lies between said gangs; a slidable tongue in said track member; and links having their inner ends pivotally attached to said tongue and having their outer ends pivotally attached to said gangs.

14. A disk harrow embodying: a front gang and a rear gang arranged in tandem relation with each other; a connecting bar having its opposite end portions pivotally attached to corresponding sides of said gangs; a track member rigidly mounted on said connecting bar along a line which lies between said gangs; a slidable tongue in said track member; links having their inner ends pivotally attached to said tongue and having their outer ends pivotally attached to said gangs; and latch means for locking said tongue at various positions in said track for adjusting the angle between the gangs.

15. A disk harrow embodying: a front gang and a rear gang arranged in tandem relation with each other; a connecting bar having its opposite end portions pivotally attached to corresponding sides of said gangs; a track member rigidly mounted on said connecting bar along a line which lies between said gangs; a slidable tongue in said track member; links having their inner ends pivotally attached to said tongue and having their outer ends pivotally attached to said gangs; and means for varying the positions of the pivotal connections between said connecting bar and said gangs.

16. A disk harrow embodying the combination of: a front gang and a rear gang arranged in tandem relation; draft means on the front gang; a rigid connection pivotally attached to one side of the front gang and to the corresponding side of the rear gang; an expansible connection interposed between the opposite side of the front gang and the correspondingly opposite side of the rear gang; means for holding said rear gang against bodily movement laterally of said front gang; and means for adjustably varying the position of said rigid connection relative to said gangs.

In testimony whereof, we have hereunto set our hands at Los Angeles, California, this 16 day of April, 1930.

EDWARD M. ENZENAUER.
ROLLIE H. MITCHELL.